(12) United States Patent
Nett

(10) Patent No.: US 7,010,995 B2
(45) Date of Patent: *Mar. 14, 2006

(54) BEVEL GEAR WITH ANNULAR HOUSING

(75) Inventor: Hans-Peter Nett, Adenau (DE)

(73) Assignee: GKN Automotive GmbH, (DE)

( * ) Notice: Subject to any disclaimer, the term of this patent is extended or adjusted under 35 U.S.C. 154(b) by 131 days.

This patent is subject to a terminal disclaimer.

(21) Appl. No.: 10/204,970

(22) PCT Filed: Nov. 21, 2001

(86) PCT No.: PCT/EP01/13511

§ 371 (c)(1),
(2), (4) Date: Oct. 16, 2002

(87) PCT Pub. No.: WO02/053942

PCT Pub. Date: Jul. 11, 2002

(65) Prior Publication Data

US 2003/0121345 A1    Jul. 3, 2003

(30) Foreign Application Priority Data

Dec. 28, 2000 (DE) ................................. 100 65 108

(51) Int. Cl.
*F16H 1/22* (2006.01)
(52) U.S. Cl. ........................ 74/416; 74/410; 74/606 R
(58) Field of Classification Search ................ 74/416, 74/417, 409, 410, 606 R
See application file for complete search history.

(56) References Cited

U.S. PATENT DOCUMENTS

| 2,235,427 | A | * | 3/1941 | Harris | .......................... 74/385 |
| 2,284,589 | A | * | 5/1942 | Rippingille | ................... 74/417 |
| 2,313,183 | A | * | 3/1943 | Trbojevich | ................... 475/336 |

(Continued)

FOREIGN PATENT DOCUMENTS

DE          2 029 866          12/1971

(Continued)

OTHER PUBLICATIONS

Basstein, Guus; Entwicklung und Anwendung von Kronenradgetrieben; Antriebstechanik, Bd. 39 (2000), No. 9, pp. 44-51.

*Primary Examiner*—William C Joyce

(57) ABSTRACT

The invention relates to an angle drive having a drive housing (51) with a first axis ($A_1$) for bearing means and with a second axis ($A_2$) for bearing means, which latter axis ($A_2$) is aligned radially relative to the first axis ($A_1$). The drive housing (51) comprises an outer ring (101) which forms two opposed annular flanges positioned perpendicularly relative to the axis ($A_1$), and a hub member (83) which is positioned co-axially relative to the outer ring (101) and which, by means of at least one radial spoke (84), is connected to the outer ring (101). The hub member (83) forms a bearing region for an input shaft (56). The housing (51) forms a sleeve member (55) which is attached to the outside of the outer ring (101). The sleeve member (55) forms a bearing region for an output shaft (68).

9 Claims, 1 Drawing Sheet

U.S. PATENT DOCUMENTS

| | | | | |
|---|---|---|---|---|
| 3,463,021 A | * | 8/1969 | Gelb | 476/11 |
| 4,191,063 A | * | 3/1980 | Borgersen | 74/388 R |
| 4,226,136 A | * | 10/1980 | Porter et al. | 74/416 |
| 4,718,516 A | * | 1/1988 | Ozaki et al. | 180/233 |
| 5,233,886 A | * | 8/1993 | Bossler, Jr. | 74/665 F |
| 5,239,880 A | * | 8/1993 | Hawkins et al. | 74/406 |
| 5,556,350 A | * | 9/1996 | Madsack | 475/85 |
| 5,606,893 A | * | 3/1997 | Shifflett | 74/527 |
| 5,807,202 A | * | 9/1998 | Sammataro | 475/336 |
| 6,073,510 A | * | 6/2000 | Tomaselli | 74/416 |
| 6,260,429 B1 | * | 7/2001 | Andrei | 74/410 |

FOREIGN PATENT DOCUMENTS

| | | |
|---|---|---|
| DE | 90 10 311.4 | 10/1990 |
| EP | 0 971 155 A1 | 1/2000 |
| GB | 546630 | 7/1942 |

* cited by examiner

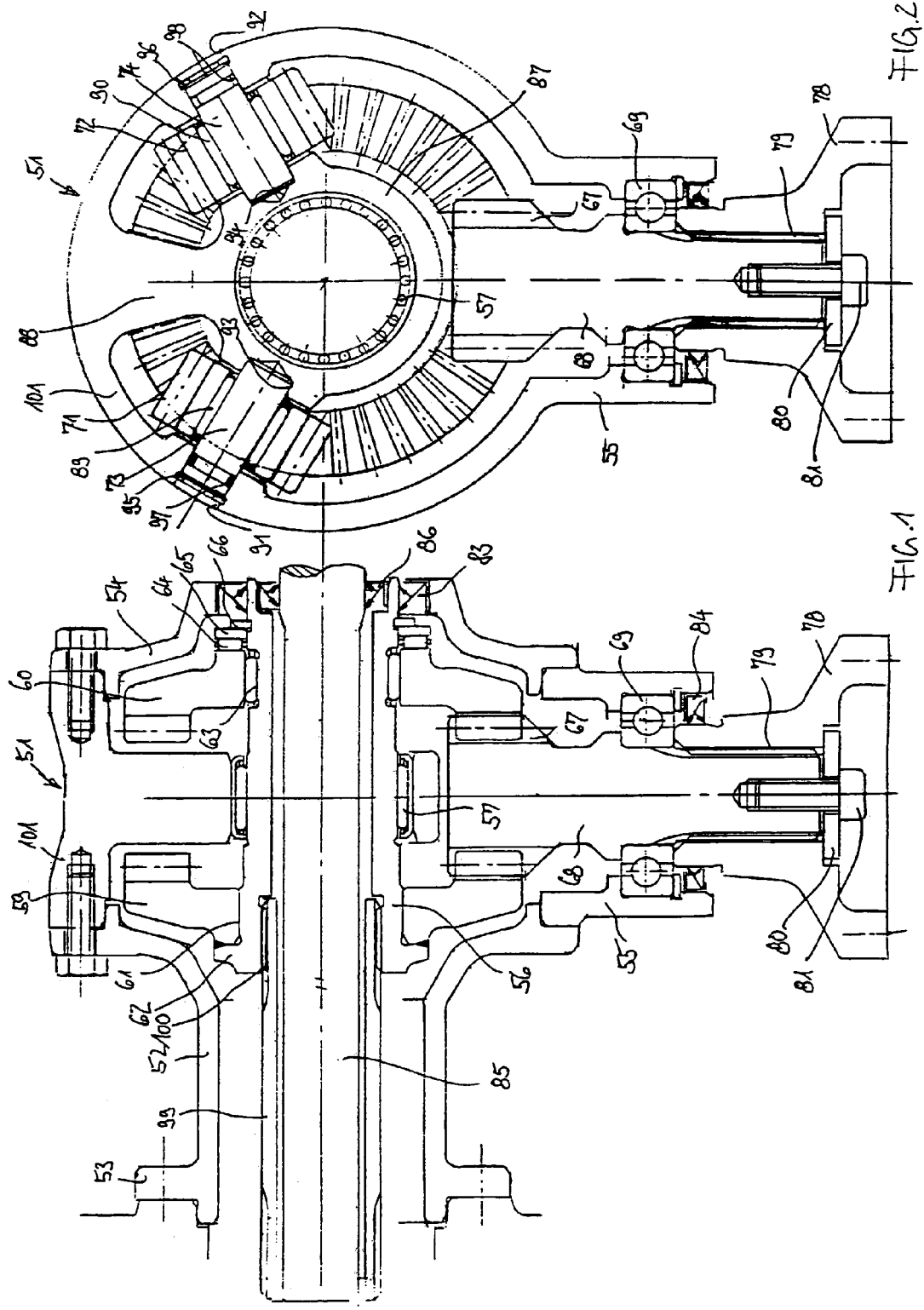

US 7,010,995 B2

BEVEL GEAR WITH ANNULAR HOUSING

BACKGROUND OF THE INVENTION

The invention relates to an angle drive having a drive housing (51) with a first axis $A_1$ for bearing means and with a second axis $A_2$ for bearing means, which latter axis is radially aligned radially relative to the first axis $A_1$.

Angle drives can be used in many ways in motor vehicles, land machinery and machine tools, just to mention a few application examples. In the field of motor vehicle technology, they are required in four-wheel drive vehicles with transversely built-in front engines. As a rule, such vehicles are derived from basic models with a front wheel drive only. In such cases, the angle drive directly follows a differential drive of the front axle, with the input shaft of the angle drive being firmly coupled to the differential carrier of the differential drive. The input shaft of the angle drive is provided in the form of a hollow shaft through which one of the sideshafts of the differential drive leads to the front axle drive.

The installation space of the angle drive to be accommodated in this way between the front axle differential and a drive-shaft behind or underneath the combustion engine is naturally very limited. Because of an ever increasing use of diesel engines with a high torque, the previously used angle drives reach their performance limit, i.e. in maximum torque runs, the required service life is no longer reached. Because of the limited installation space, the size of the angle drive cannot be increased.

Because of the installation restrictions, the objective is to design angle drives of this type in such a way that they are as short and compact as possible and to adapt same to the required torque capacity by providing same in a simple way with suitable gear sets.

SUMMARY OF THE INVENTION

The objective is achieved in that the housing comprises an outer ring which forms two opposed annular flanges positioned perpendicularly relative to the axis $A_1$, and a hub member which is positioned co-axially relative to the outer ring and which, by means of at least one radial spoke, is connected to the outer ring; the hub member forms a bearing region for an input shaft; the housing forms a sleeve member attached to the outside of the outer ring and the sleeve member forms a bearing region for an output shaft.

The housing can be closed by simple annular covers and on one side, it can, optionally, be directly bolted to a differential drive by means of the open housing ring.

According to an advantageous embodiment, it is proposed that, on the input shaft, there is firmly arranged an input ring gear, with a counter ring gear being relatively rotatable supported on said input shaft, that the output shaft carries an output gearwheel which, via its teeth, engages the input ring gear and the counter ring gear and that on at least one bearing journal aligned radially relative to the axis $A_1$, there is arranged at least one intermediate gearwheel which, via its teeth, engages the input ring gear and the counter ring gear.

In this way there is provided an angle drive with power distribution, which doubles the number of tooth engagements and at least doubles the number of tooth engagements at the first ring gear by using at least one intermediate gearwheel and a counter ring gear at the output gearwheel, which counter ring gear corresponds to the input ring gear, so that, with a predetermined torque, the tooth forces are greatly reduced, i.e. halved at the output gearwheel and at least halved at the input ring gear, as a result of which the service life is increased considerably.

If, in a preferred embodiment, the bearing journal axes $A_3$ and $A_4$ of two intermediate gears on the one hand and the axis $A_2$ of the output shaft on the other hand form identical pitch angles, it is possible, in the resulting spaces, to replace the one single radial spoke between the annular member and the hub member of the housing by three radial spokes.

The counter ring gear can be supported on the input shaft in such a way that the tooth forces at the input ring gear and at the counter ring gear can be accommodated as inner forces within the input shaft.

As an alternative, it is possible to arrange one single input ring gear on the input shaft which is supported in the hub member. For the purpose of forming a simple angle drive, said input ring gear can, on its own, engage the output gear.

Herein, on the opposite side of the input ring gear, the input shaft can be supported via an axial bearing on the hub member in such a way that the tooth forces of the input ring gear, when axially guided over the input shaft, are accommodated by the hub member. The hub member should preferably be connected to a plurality of uniformly circumferentially distributed spokes to the annular member.

In both embodiments, the housing covers can be kept free from bearing forces, and the annular housing can be connected directly to other assemblies.

The length of the input shaft can substantially be limited to the length of the annular housing part, and special installation conditions can be taken into account by inserting a plug-in sleeve into the input shaft. Furthermore, it is possible to use covers with flange sleeves of different lengths to account for special installation conditions. The basic module of the housing with an outer ring and hub member and possibly also the number of gearwheels can be the same for the different applications. The inventive angle drive thus forms a modular element which, while having the same basic design, can easily be adapted to different applications. It is possible always to use the same basic housing member and possibly the same number of gearwheels.

BRIEF DESCRIPTION OF THE DRAWINGS

A preferred embodiment of the invention is illustrated in the drawings and will be described below.

FIG. 1 is an inventive drive shown in a section through the input shaft and the output shaft.

FIG. 2 shows the drive according to FIG. 1 in section extending perpendicularly to the input shaft through the output shaft.

DETAILED DESCRIPTION OF THE INVENTION

FIGS. 1 and 2 will be described jointly below. A housing 51 of an angle drive is bolted to a flange sleeve 52 which is provided with a threaded flange 53 which comprises a first axis $A_1$ and by means of which the angle drive can be flanged to a differential drive for example. There is also provided a cover 54 which is arranged opposite the flange 52. A housing sleeve 55 whose axis $A_2$ is aligned radially relative to the axis $A_1$ is formed on to the drive housing 51. A hub 87 is held by a single radial spoke 88 so as to extend coaxially relative to the axis A1 in the annular drive housing 51. An input shaft 56 with an axis $A_1$ is supported by a radial bearing 57 in said hub 87. On one side of the bearing region, the input shaft 56 carries an input ring gear 59 which is positioned on a seat face 61 of the input shaft and is axially supported on a collar 62 to which it is welded. On the other side of the bearing region, a counter ring gear 60 of the same tooth shape and the same size is arranged so as to extend symmetrically relative to the input ring gear. The counter ring gear 60 is freely rotatably supported by a radial bearing 63 on the input shaft 56 and is held on the input shaft by an axial bearing 64, a disc 65 and a securing ring 66. The input ring gear 59 and the counter ring gear 60 are provided in the form of crown wheels; both engage an output gearwheel 67 which is formed so as to be integral with an output shaft journal 68. Said output gearwheel 67 is provided in the form of a straight spur gear. The output shaft journal 68 is supported by a ball bearing 69 in the sleeve projection 55. The output gearwheel 67 engages the input ring gear 59 and the counter ring gear 60, and this also applies to two intermediate gearwheels 71, 72 which also comprise axes $A_3, A_4$ which are aligned radially relative to the first axis $A_1$ and which are positioned in the same plane as the second axis $A_2$. The intermediate gearwheels 71, 72 run on rotary journals 73, 74 which, on the radial outside, are supported in the housing 51 and, on the radial inside, in the hub 87. The rotary journals are secured by securing rings 95, 96 and sealed by O-rings 97, 98. The intermediate gearwheels 71, 72 are supported on needle bearings 89, 90. The input shaft 56 is connected to a plug-in sleeve 99 via a shaft toothing 100. The input shaft 56 with the plug-in sleeve 99 is designed in the form of a hollow shaft, with a through-shaft 85 passing through same. The input shaft is sealed by a seal 83 relative to the cover 54 and the through-shaft 85 is sealed by a seal 86 relative to the input shaft 56. A connecting flange 78 is fixed on the end of the output shaft 68 by means of a disc 80 and a bolt 81. The shaft journal 68 and the connecting flange 78 are secured against rotation by a shaft toothing 79. Furthermore, the output shaft 68 is sealed by a seal 84 relative to the cover 54. The torque introduced via the input shaft 56 is distributed completely uniformly via the intermediate gearwheels on to the ring gears 59, 60. The tooth forces at the ring gears 59, 60 are accommodated in the form of internal forces inside the input shaft and ensure that the annular housing 51 is completely free from axial loads in the direction of the axis $A_1$. Furthermore, as a result of the symmetric arrangement of the gearwheels 67, 71, 72, the axially floatingly supported input shaft 56 is held in a centred way, so that no radial forces of any worthwhile values can reach the housing 51 from the input shaft 56. The output gearwheel 67 is centred between the ring gears 59, 60, so that the shaft journal 68 is not subjected to any bending forces. As a result of the tooth shape (straight-toothed pinions) and the double engagement with the ring gears 59, 60, no axial forces are applied in the direction of the axis $A_2$ to the output gearwheel 67 and to the bearing 69 of the output shaft journal 68.

LIST OF REFERENCE NUMBERS 51 housing
52 flange sleeve
53 flange
54 cover
55 sleeve
56 input shaft
57 bearing
58
59 input ring gear
60 counter ring gear
61 seat
62 collar
63 radial bearing
64 axial bearing
65 disc
66 securing ring
67 output gearwheel
68 shaft journal
69 bearing
78 connecting flange
79 toothing
80 disc
81 bolt
82
83 seal
84 seal
85 through-shaft
86 seal
87 hub
88 spoke
89 needle bearing
90 needle bearing
91 bore
92 bore
93 countersunk region
94 countersunk region
95 securing ring
96 securing ring
97 O-ring
98 O-ring
99 plug-in sleeve
100 toothing
101 annular member
102 intermediate sleeve

What is claimed is:

1. An angle drive comprising a drive housing defining a first axis ($A_1$) and a second axis ($A_2$), said second axis being radially aligned relative to the first axis ($A_1$), the drive housing comprising an outer ring which forms two opposed annular flanges positioned perpendicularly relative to the first axis, and a hub member which is positioned co-axially relative to the outer ring and which, by way of at least one radial spoke, is connected to the outer ring, wherein the hub member forms a bearing region for an input shaft, and the housing forms a sleeve member attached to an outside of the outer ring, and wherein the sleeve member forms a bearing region for an output shaft, and wherein an input ring gear is fixed on the input shaft, and a counter ring gear is directly rotatably supported on said input shaft, and wherein the output shaft carries an output gearwheel which, via its teeth, engages the input ring gear and the counter ring gear, and wherein on at least one bearing journal aligned radially relative to the first axis, there is arranged at least one intermediate gearwheel which, via its teeth, engages the input ring gear and the counter ring gear.

2. An angle drive according to claim 1, wherein at least two bearing journals are arranged in the housing, which bearing journals carry intermediate gearwheels and which, by means of their axes ($A_3$, $A_4$) and the second axis ($A_2$) form identical pitch angles.

3. An angle drive according to claim 2, wherein the input ring gear and the counter ring gear carry crown wheel toothings and wherein the output gearwheel and the at least one intermediate gearwheel comprise cylindrical pinions with straight toothing or helical toothing.

4. An angle drive according to claim 3, wherein at least two radial spokes are arranged so as to be uniformly angularly distributed between the outer ring and the hub member.

5. An angle drive according to claim 2, wherein at least two radial spokes are arranged so as to be uniformly angularly distributed between the outer ring and the hub member.

6. An angle drive according to claim 1, wherein the input ring gear and the counter ring gear carry crown wheel toothings and wherein the output gearwheel and the at least one intermediate gearwheel comprise cylindrical pinions with straight toothing or helical toothing.

7. An angle drive according to claim 6, wherein at least two radial spokes are arranged so as to be uniformly angularly distributed between the outer ring and the hub member.

8. An angle drive according to claim 1, wherein at least two radial spokes are arranged so as to be uniformly angularly distributed between the outer ring and the hub member.

9. An angle drive according to claim 1, wherein at least two radial spokes are arranged so as to be uniformly angularly distributed between the outer ring and the hub member.

* * * * *